Sept. 3, 1935.  L. P. KALB  2,013,157
ENGINE
Filed July 6, 1931   2 Sheets-Sheet 1
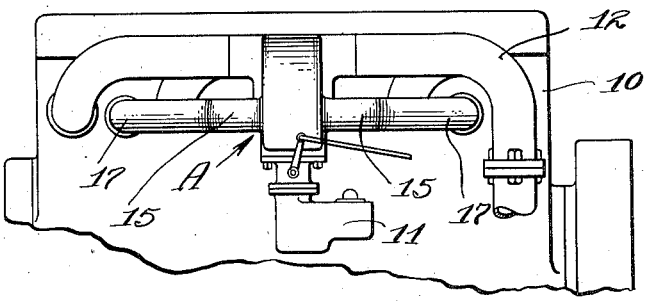
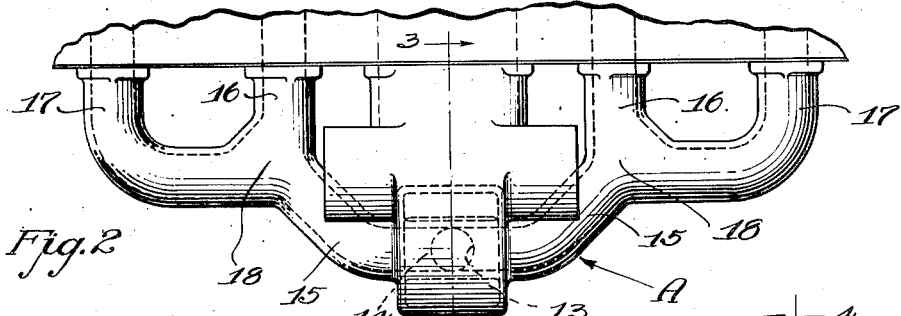
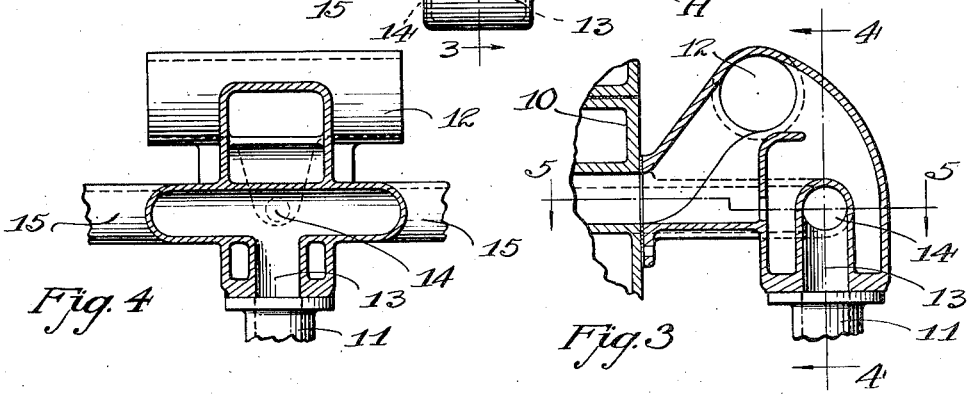
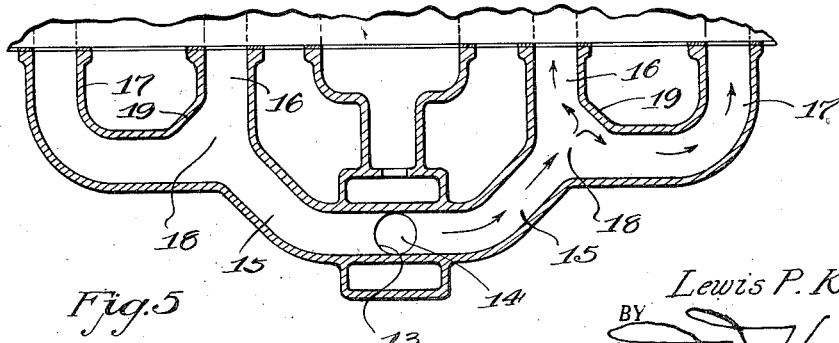
INVENTOR.
Lewis P. Kalb
BY
ATTORNEY.

INVENTOR.
Lewis P. Kalb
BY
ATTORNEY.

Patented Sept. 3, 1935

2,013,157

UNITED STATES PATENT OFFICE 2,013,157

ENGINE

Lewis P. Kalb, Detroit, Mich., assignor to Continental Motors Corporation, Detroit, Mich., a corporation of Virginia Application July 6, 1931, Serial No. 548,781

14 Claims. (Cl. 123—52)

My invention relates to engines and more particularly to an intake manifold structure therefor adapted for distributing a fuel mixture to the engine cylinders.

An object of my present invention is to improve engine efficiency and performance by providing an improved fluid conducting and distributing intake manifold structure.

Another object of my invention is to construct an intake manifold structure for an internal combustion engine having a plurality of cylinders and provide deflecting means for dividing the fuel mixture after the same has attained equilibrium and distributing predetermined quantities of same to a plurality of manifold branch portions communicating with the engine cylinders.

Figure 6:
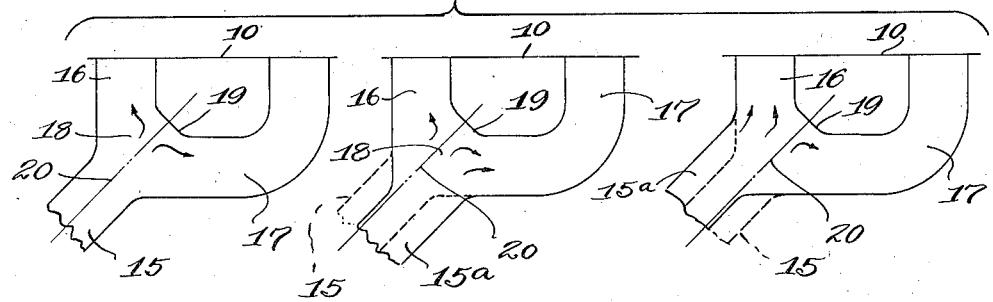

For a more detailed understanding of my invention, reference may be had to the accompanying drawings which illustrate one form which my invention may assume, and in which:

Fig. 1 is a fragmentary side elevational view of an engine equipped with an intake manifold structure constructed in accordance with my invention, Fig. 2 is a plan view of the intake manifold structure, Fig. 3 is a vertical transverse sectional view taken substantially on the line 3—3 of Fig. 2, Fig. 4 is a detailed vertical sectional view thereof taken on the line 4—4 of Fig. 3, Fig. 5 is a horizontal sectional view of the manifold structure taken on the line 5—5 of Fig. 3, Fig. 6 is a diagrammatic view of the fluid distributing means illustrating relative variations in the structure for controlling fluid distribution by offsetting the fluid deflecting means with respect to the axis of the runner or primary fluid conducting portion.

Figure 7:
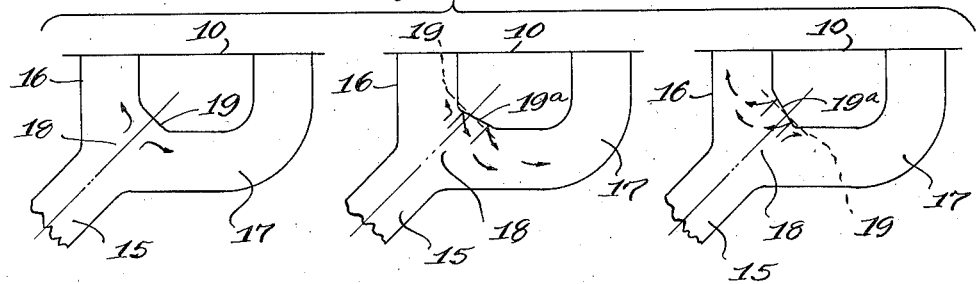
Figure 8:
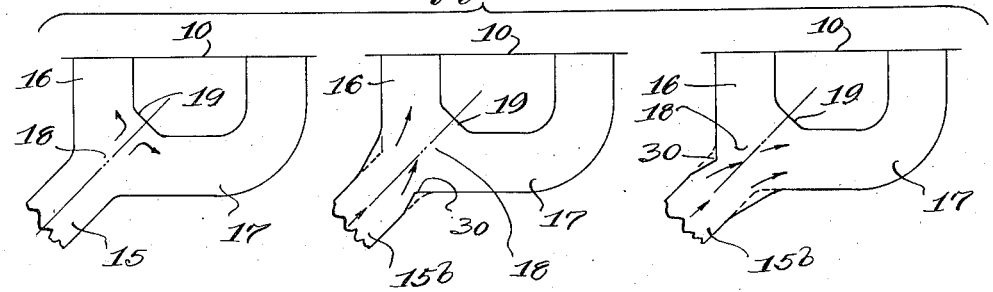

Fig. 7 is a diagrammatic view of a modified structure in which fluid distribution control is obtained by positioning said fluid deflecting means obliquely to the vertical axial plane of the primary portion, and Fig. 8 is a diagrammatic view of a further modified construction illustrating means for imparting directional movement to the fluid flowing through said primary portion for obtaining a fluid distribution into the communicating secondary portions.

"A" designates an intake manifold structure which is adapted for assembly with an internal combustion engine which in general includes a cylinder block 10 and a fuel mixture forming device or carburetor 11. An exhaust manifold 12 is cooperatively associated therewith.

The intake manifold structure A includes a riser or other suitable fuel mixture conducting portion 13 which is connected with said carburetor and communicates with a fuel mixture distributing chamber 14. Lateral runner portions or conduits 15 communicate with said chamber and preferably extend in opposite directions substantially longitudinally of the engine and are provided with portions remote from said chamber which extend obliquely to a longitudinal plane through the engine containing the cylinder axes. These lateral runner portions may broadly be termed primary fluid conducting portions. Secondary fluid conducting or branch portions 16 and 17 are constructed in open communication with and branched from said primary conducting portions at a common junction 18 and I preferably designate that portion of the manifold structure A, adjacent the junction 18 of said secondary portions or branches and the primary portion, the outlet of said primary portion.

The fluid, including both the wet fuel and fuel mixture is conducted to the junction 18 which is spaced from the fuel mixture distributing chamber 14 by the primary portion or closed conduit 15, said primary portion providing a closed conduit, which is substantially straight and of uniform cross-sectional area, having a length sufficient to permit the fluid introduced therein to be established in a state of equilibrium prior to being divided for distribution to the secondary portions 16 and 17.

The manifold structure is constructed adjacent the junction of said secondary portions and the primary portion in such a manner as to divide and distribute the fluid into the secondary portions after the fluid has attained equilibrium. This is preferably accomplished in the illustrated embodiment of my invention by providing a fluid deflecting means adjacent the junction of said branches with the lateral runner. Preferably, the manifold structure is provided with a relatively flat wall 19 opposite to the lateral runner outlet or terminus and intermediate the manifold branch or secondary portions 16 and 17, said wall facing the fluid flowing through said primary portion. In the construction illustrated in Fig. 5 this wall is preferably aligned with respect to the axis of the runner or primary portion in such a manner as to cause the fluid stream to impinge itself thereon, said wall being preferably positioned substantially at right angles or perpendicular to the fluid stream which is substantially parallel to the axis of the primary portion at the time when said stream is impinged on said wall.

This wall serves as a deflector for dividing and distributing the fluid to the branch or secondary portions 16 and 17 in separate streams. Due to the fact that the branch or secondary portion 16 is much shorter than the branch or secondary portion 17 and offers less resistance to the fluid flow, it is found that the fluid is distributed in such a way as to supply more of the fluid to portion 16 than to portion 17. However, an intake manifold structure such as herein illustrated efficiently distributes the fluid and is adapted for employment with multi-cylinder engines of 4, 6, or 8 cylinders.

In Figs. 6 to 8 inclusive I have illustrated the manner in which the principle of my invention may be employed in a more advantageous manner to control the distribution of the fluid for supplying substantially equal amounts of fluid to the engine cylinders. In the modified structure illustrated in Fig. 6, fluid distribution is controlled by the relative position of the deflecting wall 19 with respect to the axis of the runner or primary fluid conducting portion. This figure diagrammatically illustrates the portion 15ª offset to one side of the other of the axis 20 but extending substantially perpendicular to the wall 19. Thus, as illustrated the fluid is divided and distributed in such a manner as to induce a relatively greater flow of the fuel mixture in one secondary portion than the other. In the middle illustration of Fig. 6, the primary portion is offset to induce a greater fluid flow in branch or secondary portion 17, while in the illustration at the right, the runner is offset to induce a relatively greater fluid flow in branch or secondary portion 16. This construction is of special importance when one of the branch portions is to be connected with Siamese engine intake ports.

In Fig. 7, a further modification is illustrated in which the deflecting wall 19ª is inclined obliquely to the axis of the primary portion. Thus, when the wall is constructed as shown in the middle illustration the fluid is acted upon after the same has attained equilibrium to deflect same in such a way as to induce a relatively greater fluid flow in manifold branch 17, while in the illustration on the right, the deflecting wall is oppositely inclined obliquely to the axis of the primary conducting portion and induces a relatively greater fluid flow in branch or secondary portion 16.

In Fig. 8 a still further modification is illustrated and shows the runner or primary fluid conducting portion being constructed adjacent the outlet thereof at the junction of the primary portion with said secondary portions whereby to provide means acting on the fluid after the same has attained equilibrium to deflect the fluid flow in such a manner as to cause the same to impinge obliquely on the deflecting wall 19. Thus, the fluid distribution is controlled by directing the same in the general direction of the manifold branch or secondary portion into which a relatively greater quantity of fluid is to be supplied. This is accomplished by providing deflecting projections or baffles 30 adjacent the outlet of the runner or primary portion 15ᵇ and it will be noted that the construction illustrated in the middle figure induces a relatively greater fluid flow in branch or secondary portion 16, while the illustration at the right of Fig. 8 induces a relatively greater fluid flow in the manifold branch or secondary portion 17.

It will be noted that all illustrated embodiments of my invention deflect the fluid stream at a point spaced from the fuel mixture distributing chamber 14 a distance sufficient to permit the fluid to attain equilibrium and so divides the fluid stream as to distribute the fluid in predetermined quantities to the several manifold secondary portions 16 and 17.

It will be apparent to those skilled in the art to which my invention pertains that various modifications and changes may be made therein without departing from the spirit of my invention or from the scope of the appended claims.

What I claim as my invention is:

1. In an internal combustion engine having a plurality of cylinders and a fuel mixture forming device, an intake manifold structure having a primary fuel mixture distributing chamber, a primary fuel mixture conducting portion connecting said chamber with said fuel mixture forming device, a runner portion communicating with said chamber, manifold branch portions adapted for communication with said runner portion at a point remote from the primary fuel mixture distributing chamber, said manifold structure provided with a fuel mixture deflecting wall adjacent the junction of the manifold branch portions and the runner portion, said wall positioned at an oblique angle to the vertical axial plane of the runner portion to favor fuel mixture flow into one of said manifold branch portions more than the other as determined by the relative resistance to the fluid flow in said branch portions.

2. An intake manifold structure for an engine including a fuel mixture conducting portion, a lateral fuel mixture conducting portion communicating with said first portion, a plurality of branch fuel mixture conducting portions connecting said lateral conducting portion with the engine, and means acting on the fluid introduced into said lateral conducting portion for dividing same for distribution to said branch conducting portions, said lateral conducting portion intermediate the junction therewith of said first conducting portion and of said first branch conducting portion forming a closed straight conduit of substantially uniform cross-section throughout its length and having a length sufficient to permit the fluid flow to attain equilibrium prior to being acted upon by said fluid dividing means.

3. An intake manifold structure for a multi-cylinder internal combustion engine, said structure including a distributing chamber, a primary fluid conducting portion extending generally longitudinally of the engine, means for introducing fluid to said primary portion from said distributing chamber in a manner tending to cause said fluid to flow in an unbalanced condition into said primary portion, a plurality of secondary fluid conducting portions communicating with and branched at a common junction from said primary portion, and dividing means at the junction, said dividing means facing the fluid flowing through said primary portion to divide the fluid for distribution in separate streams to said secondary portions, said primary conducting portion providing a closed conduit connecting the distributing chamber and said junction, said conduit being substantially straight and of substantially uniform cross-sectional area throughout its length and having a length sufficient to substantially establish equilibrium of the fluid in said primary portion at the outlet thereof adjacent said junction.

4. An intake manifold structure for a multi-cylinder internal combustion engine, said structure including a distributing chamber, a primary fluid conducting portion extending generally longitudinally of the engine, means for introducing fluid to said primary portion from said distributing chamber in a manner tending to cause said fluid to flow in an unbalanced condition into said primary portion, a plurality of secondary fluid conducting portions communicating with and branched at a common junction from said primary portion, and dividing means at the junction, said dividing means facing the fluid flowing through said primary portion to divide the fluid for distribution in separate streams to said secondary portions, said primary conducting portion providing a substantially straight closed conduit connecting the distributing chamber and said junction, the straight closed portion of said conduit having a length sufficient to substantially establish equilibrium of the fluid in said primary portion at the outlet thereof adjacent said junction.

5. An intake manifold structure for a multi-cylinder internal combustion engine, said structure including a distributing chamber, a primary fluid conducting portion extending generally longitudinally of the engine, means for introducing fluid to said primary portion from said distributing chamber in a manner tending to cause said fluid to flow in an unbalanced condition into said primary portion, a plurality of secondary fluid conducting portions communicating with and branched at a common junction from said primary portion, and dividing means at the junction, said dividing means facing the fluid flowing through said primary portion to divide the fluid for distribution in separate streams to said secondary portions, said primary conducting portion providing a substantially straight closed conduit connecting the distributing chamber and said junction, the straight closed portion of said conduit having an unrestricted length sufficient to substantially establish equilibrium of the fluid in said primary portion at the outlet thereof adjacent said junction.

6. An intake manifold structure for a multi-cylinder internal combustion engine, said structure including a distributing chamber, a primary fluid conducting portion extending generally longitudinally of the engine, means for introducing fluid to said primary portion from said distributing chamber in a manner tending to cause said fluid to flow in an unbalanced condition into said primary portion, a plurality of secondary fluid conducting portions communicating with and branched at a common junction from said primary portion, and dividing means at the junction, said dividing means facing the fluid flowing through said primary portion to divide the fluid for distribution in separate streams to said secondary portions, said primary conducting portion providing a substantially straight closed conduit connecting the distributing chamber and said junction, the straight closed portion of said conduit having an unrestricted length of substantially uniform cross-sectional area sufficient to substantially establish equilibrium of the fluid in said primary portion at the outlet thereof adjacent said junction.

7. An intake manifold structure for a multi-cylinder internal combustion engine, said structure including a distributing chamber, a primary fluid conducting portion extending generally longitudinally of the engine, means for introducing fluid to said primary portion from said distributing chamber in a manner tending to cause said fluid to flow in an unbalanced condition into said primary portion, a plurality of secondary fluid conducting portions communicating with and branched at a common junction from said primary portion, and dividing means at the junction, said dividing means facing the fluid flowing through said primary portion and being constructed to unequally divide the fluid for distribution in separate streams of unequal volume to said secondary portions, said primary conducting portion providing a substantially straight closed conduit connecting the distributing chamber and said junction, the straight closed portion of said conduit having a length sufficient to substantially establish equilibrium of the fluid in said primary portion at the outlet thereof adjacent said junction.

8. An intake manifold structure for a multi-cylinder internal combustion engine, said structure including a distributing chamber, a primary fluid conducting portion extending generally longitudinally of the engine, means for introducing fluid to said primary portion from said distributing chamber in a manner tending to cause said fluid to flow in an unbalanced condition into said primary portion, a plurality of secondary fluid conducting portions communicating with and branched at a common junction from said primary portion, and dividing means at the junction, said dividing means comprising a flat wall intermediate said secondary portions and facing the fluid flowing through said primary portions to divide the fluid for distribution in separate streams to said secondary portions, said primary conducting portion having a length sufficient to substantially establish equilibrium of the fluid in said primary portion at the outlet thereof adjacent said junction.

9. An intake manifold structure for a multi-cylinder internal combustion engine, said structure including a distributing chamber, a primary fluid conducting portion extending generally longitudinally of the engine, means for introducing fluid to said primary portion from said distributing chamber in a manner tending to cause said fluid to flow in an unbalanced condition into said primary portion, a plurality of secondary fluid conducting portions communicating with and branched at a common junction from said primary portion, and dividing means at the junction, said dividing means being aligned substantially with the axis of the primary portion and facing the fluid flowing through said primary portion to equally divide the fluid for distribution in separate streams of substantially equal volume to said secondary portions, said primary conducting portion providing a substantially straight closed conduit connecting the distributing chamber and said junction, the straight closed portion of said conduit having a length sufficient to substantially establish equilibrium of the fluid in said primary portion at the outlet thereof adjacent said junction.

10. An intake manifold structure for a multi-cylinder internal combustion engine, said structure including a distributing chamber, a primary fluid conducting portion extending generally longitudinally of the engine, means for introducing fluid to said primary portion from said distributing chamber in a manner tending to cause said fluid to flow in an unbalanced condition into said primary portion, a plurality of secondary fluid conducting portions communicating with and branched at a common junction from said primary portion, and dividing means at the junction, said dividing means comprising a substantially flat wall providing a deflecting surface facing the fluid flowing through said primary portion and providing a deflecting surface against which the fluid is impinged to divide the fluid for distribution in separate streams to said secondary portions, said primary conducting portion having a length sufficient to substantially establish equilibrium of the fluid in said primary portion at the outlet thereof adjacent said junction.

11. An intake manifold structure for a multi-cylinder internal combustion engine, said structure including a distributing chamber, a primary fluid conducting portion extending generally longitudinally of the engine, means for introducing fluid to said primary portion from said distributing chamber in a manner tending to cause said fluid to flow in an unbalanced condition into said primary portion, a plurality of secondary fluid conducting portions communicating with and branched at a common junction from said primary portion, and dividing means at the junction, said dividing means comprising a fluid deflecting wall facing the fluid flowing through said primary portion and constructed to unequally divide the fluid for distribution in separate streams to said secondary portions whereby to induce a greater flow of fluid in one of said secondary portions than in the other, said primary conducting portion providing a substantially straight closed conduit of substantially uniform cross sectional area and having a length sufficient to substantially establish equilibrium of the fluid in said primary portion at the outlet thereof adjacent said junction.

12. An intake manifold structure for a multi-cylinder internal combustion engine, said structure including a primary fluid conducting portion extending generally longitudinally of the engine, means for introducing fluid to said primary portion in a manner tending to cause said fluid to flow in an unbalanced condition into said primary portion, a plurality of secondary fluid conducting portions communicating with and branched at a common junction from said primary portion, and dividing means at the junction and facing the fluid flowing through said primary portion to divide the fluid for distribution in separate streams to said secondary portions, said primary portion having means adjacent the outlet thereof directing the fluid stream to said junction in such a manner as to favor the fluid flow to one side of the dividing means.

13. An intake manifold structure for a multi-cylinder internal combustion engine, said structure including a primary fluid conducting portion extending generally longitudinally of the engine, means for introducing fluid to said primary portion in a manner tending to cause said fluid to flow in an unbalanced condition into said primary portion, a plurality of secondary fluid conducting portions communicating with and branched at a common junction from said primary portion, and dividing means at the junction and facing the fluid flowing through said primary portion to divide the fluid for distribution in separate streams to said secondary portions, said primary portion having fluid deflecting means at the outlet thereof cooperating with said dividing means to favor the fluid flow into one of secondary portions more than into the other.

14. An intake manifold structure for a multi-cylinder internal combustion engine, said structure including a primary fluid conducting portion extending generally longitudinally of the engine, means for introducing fluid to said primary portion in a manner tending to cause said fluid to flow in an unbalanced condition into said primary portion, a plurality of secondary fluid conducting portions communicating with and branched at a common junction from said primary portion, and dividing means at the junction and facing the fluid flowing through said primary portion to divide the fluid for distribution in separate streams to said secondary portions, said dividing means comprising a wall portion inclined at an oblique angle to the direction of flow of said fluid stream at the outlet of said primary portion to favor the distribution of the fluid into one of said secondary portions more than into the other secondary portion.

LEWIS P. KALB.